US012683077B2

(12) United States Patent
Oie et al.

(10) Patent No.: US 12,683,077 B2
(45) Date of Patent: Jul. 14, 2026

(54) MULTILAYER CERAMIC ELECTRONIC COMPONENT

(71) Applicant: Murata Manufacturing Co., Ltd., Nagaokakyo (JP)

(72) Inventors: Hirofumi Oie, Nagaokakyo (JP); Takamori Igarashi, Nagaokakyo (JP); Makoto Takada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 150 days.

(21) Appl. No.: 18/910,087

(22) Filed: Oct. 9, 2024

(65) Prior Publication Data

US 2025/0037937 A1     Jan. 30, 2025

Related U.S. Application Data

(63) Continuation of application No. PCT/JP2023/010633, filed on Mar. 17, 2023.

(30) Foreign Application Priority Data

Apr. 13, 2022     (JP) ................................. 2022-066477

(51) Int. Cl.
*H01G 4/12* (2006.01)
*H01G 4/30* (2006.01)
*H01G 4/008* (2006.01)

(52) U.S. Cl.
CPC ............. *H01G 4/1227* (2013.01); *H01G 4/30* (2013.01); *H01G 4/0085* (2013.01)

(58) Field of Classification Search
CPC ....... H01G 4/0085; H01G 4/30; H01G 4/1227
See application file for complete search history.

(56) References Cited

U.S. PATENT DOCUMENTS

| | | | |
|---|---|---|---|
| 8,592,041 | B2 | 11/2013 | Adachi et al. |
| 8,846,210 | B2 | 9/2014 | Sakurai et al. |
| 9,148,109 | B2 | 9/2015 | Sasaki et al. |
| 9,214,259 | B2 | 12/2015 | Adachi et al. |
| 2006/0287184 | A1 | 12/2006 | Mori et al. |
| 2007/0213202 | A1 | 9/2007 | Arashi et al. |
| 2007/0237935 | A1 | 10/2007 | Mori et al. |
| 2011/0223399 | A1 | 9/2011 | Adachi et al. |
| 2011/0223431 | A1 | 9/2011 | Sakurai et al. |

(Continued)

FOREIGN PATENT DOCUMENTS

| | | | | |
|---|---|---|---|---|
| EP | 2236478 A1 | * | 10/2010 | ........... C04B 35/462 |
| EP | 2372731 A1 | * | 10/2011 | ........... H05K 1/0306 |

(Continued)

OTHER PUBLICATIONS

International Search Report received for PCT Patent Application No. PCT/JP2023/010633, mailed on May 30, 2023, 2 pages (English Translation Only).

*Primary Examiner* — David M Sinclair
(74) *Attorney, Agent, or Firm* — ArentFox Schiff LLP

(57) ABSTRACT

A multilayer ceramic electronic component that includes: a ceramic layer that contains a Ba—Nd—Ti oxide, forsterite, barium borosilicate glass, and MnO; and an electrode in contact with the ceramic layer, wherein the ceramic layer includes a Nd uneven distribution portion where Nd is unevenly distributed at an interface where the ceramic layer is in contact with the electrode.

15 Claims, 8 Drawing Sheets

(56)                    References Cited

U.S. PATENT DOCUMENTS

| | | | |
|---|---|---|---|
| 2013/0162372 | A1 | 6/2013 | Sasaki et al. |
| 2014/0362491 | A1 | 12/2014 | Adachi et al. |
| 2015/0030830 | A1 | 1/2015 | Adachi et al. |

FOREIGN PATENT DOCUMENTS

| | | | |
|---|---|---|---|
| JP | 2006-001757 | A | 1/2006 |
| JP | 2006-124270 | A | 5/2006 |
| JP | 2008-037739 | A | 2/2008 |
| JP | 2011-211158 | A | 10/2011 |
| JP | 4797534 | B2 | 10/2011 |
| JP | 2013-134999 | A | 7/2013 |
| JP | 5316545 | B2 | 10/2013 |
| JP | 5617833 | B2 | 11/2014 |
| JP | 5796602 | B2 | 10/2015 |
| JP | 2021-153105 | A | 9/2021 |
| WO | 2013/121928 | A1 | 8/2013 |

* cited by examiner

MULTILAYER CERAMIC ELECTRONIC COMPONENT

CROSS REFERENCE TO RELATED APPLICATIONS

The present application is a continuation of International application No. PCT/JP2023/010633, filed Mar. 17, 2023, which claims priority to Japanese Patent Application No. 2022-066477, filed Apr. 13, 2022, the entire contents of each of which are incorporated herein by reference.

TECHNICAL FIELD

The present disclosure relates to a multilayer ceramic electronic component.

BACKGROUND ART

Known multilayer ceramic electronic components include one including ceramic layers and an electrode at a boundary between the ceramic layers.

Patent Literature 1 discloses a method for producing an electronic component including ceramics and an internal electrode, the ceramics containing a Ba—Nd—Ti oxide, forsterite, barium borosilicate glass, and MnO as main materials, and the internal electrode containing Cu.

Patent Literature 1: JP 2013-134999 A

SUMMARY OF THE DISCLOSURE

According to Patent Literature 1, when ceramic layers and the internal electrode, which are made of different types of materials, are simultaneously fired, the internal electrode, which has an action to suppress interdiffusion, actually causes intensive interdiffusion at a portion with no internal electrode. This leads to a defect that makes the internal electrode and the ceramic layers prone to deformation due to ceramic deterioration.

Patent Literature 1 describes, as a solution to the above defect, a method in which a component common to a component contained in the ceramic layer is added to the internal electrode to reduce the difference between the interdiffusion that may occur at a portion with the internal electrode during firing and the interdiffusion that may occur at a portion with no internal electrode during firing, whereby intensive interdiffusion at the portion with no internal electrode is alleviated. According to the literature, the method suppresses interdiffusion between different types of ceramics and between the ceramics and the internal electrode, resulting in improved adhesion between different types of ceramics and improved structural reliability.

However, in the method disclosed in Patent Literature 1, the interdiffusion between the ceramics and the internal electrode is also suppressed, and this unfortunately causes a decrease in adhesion strength between the ceramics and the internal electrode.

Thus, the present disclosure aims to provide a multilayer ceramic electronic component having high adhesion strength between the ceramic layer and the electrode.

The multilayer ceramic electronic component of the present disclosure is a multilayer ceramic electronic component that includes: a ceramic layer that contains a Ba—Nd—Ti oxide, forsterite, barium borosilicate glass, and MnO; and an electrode in contact with the ceramic layer, wherein the ceramic layer includes a Nd uneven distribution portion where Nd is unevenly distributed at an interface where the ceramic layer is in contact with the electrode.

The present disclosure can provide a multilayer ceramic electronic component having high adhesion strength between the ceramic layer and the electrode.

DESCRIPTION OF THE PREFERRED EMBODIMENTS

Hereinafter, the multilayer ceramic electronic component of the present disclosure is described. The present disclosure is not limited to the following preferred embodiments, and may be suitably modified without departing from the gist of the present disclosure. Combinations of two or more preferred features described in the following preferred embodiments are also within the scope of the present disclosure.

Figure 1:
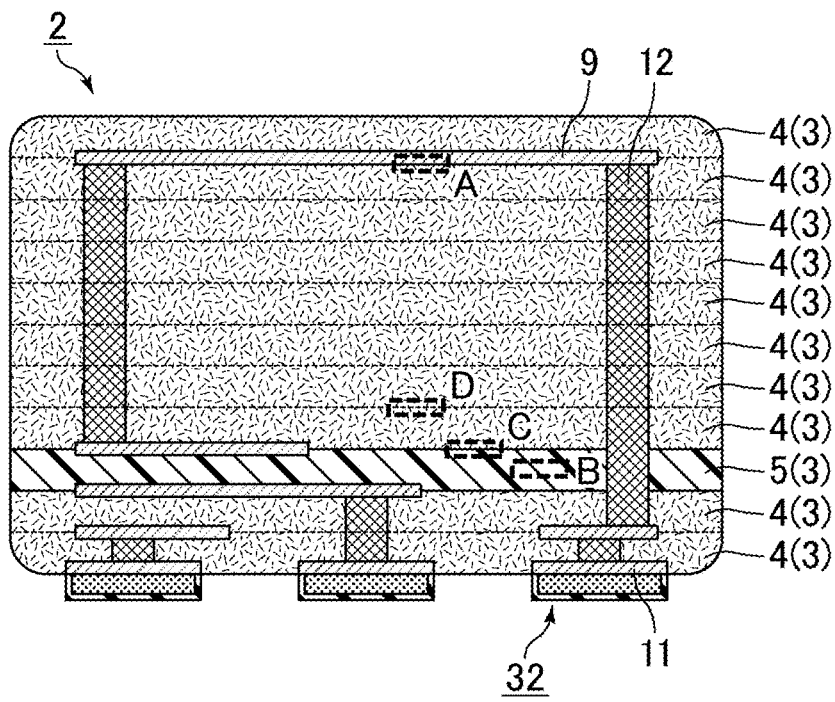
FIG. 1 is a schematic cross-sectional view of an example of a multilayer ceramic electronic component of the present disclosure.

FIG. 1 is a schematic cross-sectional view of an example of a multilayer ceramic electronic component of the present disclosure. As shown in FIG. 1, a multilayer ceramic electronic component 2 includes a stack of multiple ceramic layers 3 (11 layers in FIG. 1).

The ceramic layers 3 include a first ceramic layer 4 and a second ceramic layer 5 having different compositions. The multilayer ceramic electronic component of the present disclosure may include ceramic layers of different composition types or may include ceramic layers of the same type. The multilayer ceramic electronic component may include only one ceramic layer.

The multilayer ceramic electronic component 2 shown in FIG. 1 includes internal electrodes 9 and via hole conductors 12 in an inner portion thereof. The multilayer ceramic electronic component 2 includes external electrodes 11 on a surface thereof. Each external electrode 11 includes a plating layer 32 on a surface thereof.

The internal electrodes 9, the via hole conductors 12, and the external electrodes 11 are in contact with the ceramic layers 3. Each of the internal electrodes 9, the via hole conductors 12, and the external electrodes 11 corresponds to "the electrode in contact with the ceramic layer" as defined herein.

The multilayer ceramic electronic component may be a multilayer ceramic substrate on which a chip component and the like can be mounted, or may be a chip component that can be mounted on a substrate. It may also be a module in which a chip component is mounted on a multilayer ceramic substrate. Examples of the chip component include LC filters, capacitors, and inductors.

The multilayer ceramic electronic component may be capable of being mounted on a motherboard (not shown) using an external electrode as a connection terminal.

Among the internal electrodes 9, some internal electrodes that face each other with the ceramic layer 3 therebetween may be arranged to provide capacitance so as to form a capacitor. Preferably, the ceramic layer to form a capacitor is a high permittivity ceramic layer.

In FIG. 1, the second ceramic layer 5 is used as a ceramic layer to form a capacitor.

Ceramics in the ceramic layers contain a Ba—Nd—Ti oxide, forsterite, barium borosilicate glass, and MnO.

Ceramics in the ceramic layer may contain a Ba—Nd—Ti oxide or forsterite as a main component and barium borosilicate glass and MnO as sintering aids.

A ceramic layer containing a Ba—Nd—Ti oxide as a main component can be provided as a high permittivity ceramic layer. A ceramic layer containing forsterite as a main component can be provided as a low permittivity ceramic layer.

Preferably, each electrode in contact with a ceramic layer is a material that can be co-sintered with the ceramic layer. The electrode is also preferably an electrode containing Cu, and is preferably an electrode containing Cu as a main component. Ag or a Ag—Pd alloy may be used instead of Cu.

In the multilayer ceramic electronic component of the present disclosure, the ceramic layer includes a Nd uneven distribution portion where Nd is unevenly distributed at an interface where the ceramic layer is in contact with the electrode.

An example of a region including such an interface is shown as a region A in FIG. 1.

Since the Nd uneven distribution portion is present in the ceramic layer at the interface where the ceramic layer is in contact with the electrode, a multilayer ceramic electronic component having high adhesion strength between the ceramic layer and the electrode can be provided.

The following describes the Nd uneven distribution portion.

Figure 2:
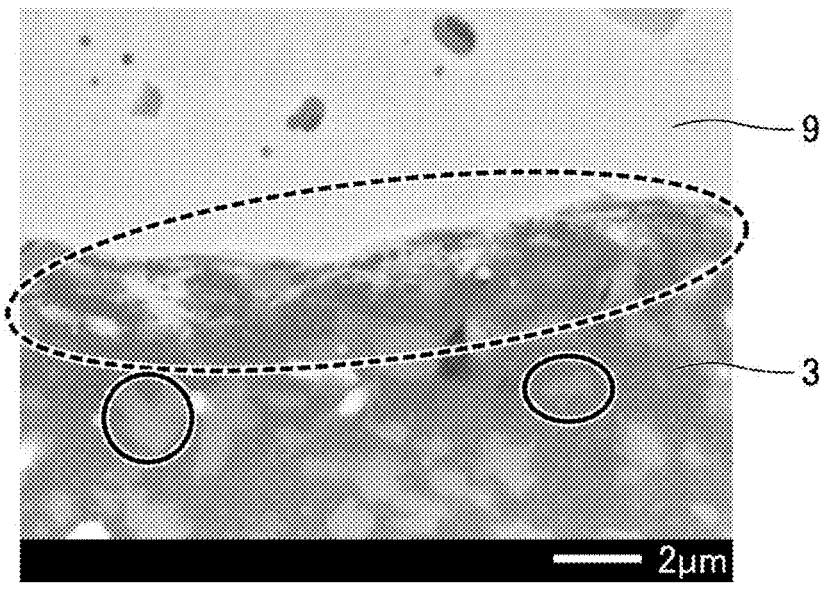
FIG. 2 is an electron microscope photo taken at and around an interface between a ceramic layer and an electrode in the multilayer ceramic electronic component of the present disclosure.

FIG. 2 is an electron microscope photo taken at and around an interface between a ceramic layer and an electrode in the multilayer ceramic electronic component of the present disclosure.

Figure 3:
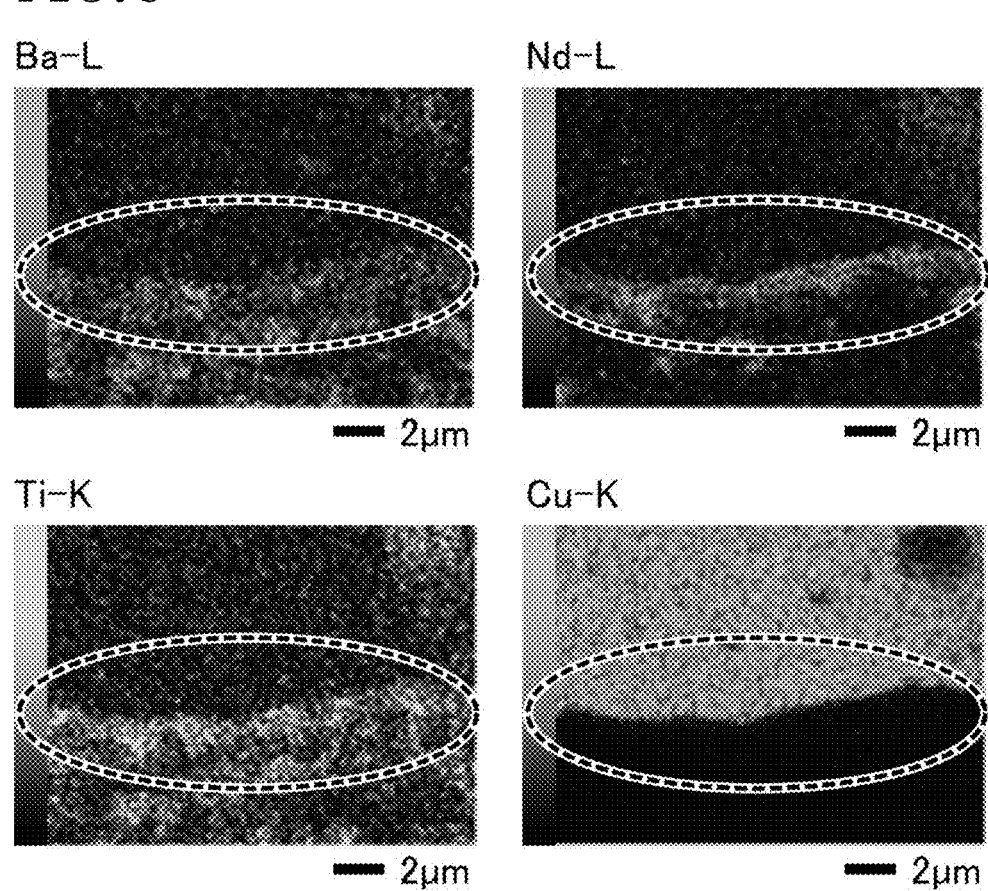
FIG. 3 includes elemental mapping images by energy dispersive X-ray analysis (EDX) of the photo shown in FIG. 2.

FIG. 3 includes elemental mapping images by energy dispersive X-ray analysis (EDX) of the photo shown in FIG. 2. Ba, Nd, Cu, and Ti elemental mapping images are shown clockwise from top left in FIG. 3. Since the photographed electrode has a composition containing Cu, the position of Cu corresponds to the position of the electrode. The ceramic layer has a composition containing a Ba—Nd—Ti oxide and not containing Cu.

In FIG. 2, the ceramic layer 3 is located on the lower side, and the electrode (the internal electrode 9) is located on the upper side. The interface where the ceramic layer is in contact with the electrode is a boundary line at which the color changes on the photo shown in FIG. 2.

The Nd uneven distribution portion is a portion present in the ceramic layer at the interface where the ceramic layer is in contact with the electrode. The presence of the Nd uneven distribution portion can be determined from the Nd elemental mapping image shown in the upper right of FIG. 3.

In each of the images in FIG. 2 and FIG. 3, a portion of the boundary between the ceramic layer and the electrode is shown as a region surrounded by a dotted line. The Nd elemental mapping image shows that Nd is unevenly distributed in the ceramic layer at the interface where the ceramic layer is in contact with the electrode. Nd is unevenly distributed in the ceramic layer and is not diffused in the electrode. This can be understood from the consistency between the position of the boundary line as the interface where the ceramic layer is in contact with the electrode and the upper boundary line of the portion where Nd is unevenly distributed.

The portion where Nd is unevenly distributed in the ceramic layer is the Nd uneven distribution portion.

The Cu elemental mapping image shows that Cu is not diffused in the ceramic layer at the interface where the ceramic layer is in contact with the electrode. This can be understood from the consistency between the position of the boundary line as the interface where the ceramic layer is in contact with the electrode and the lower boundary line of the position where Cu is present.

When such a Nd uneven distribution portion is present, the adhesion strength between the ceramic layer and the electrode increases. This prevents separation of the electrode from the ceramic layer.

As described earlier, Nd is unevenly distributed in the ceramic layer and is not diffused in the electrode. Cu is not diffused in the ceramic layer. In other words, in the present disclosure, the adhesion strength between the ceramic layer and the electrode is increased by providing the Nd uneven distribution portion in the ceramic layer, instead of by mutually diffusing the materials of the ceramic layer and the materials of the electrode.

This indicates that the present disclosure is different from Patent Literature 1 in which the adhesion strength between the ceramic layer and the electrode is changed by changing the degree of interdiffusion between the ceramic layer and the electrode. In other words, the point of focus of the present application for increasing the adhesion strength between the ceramic layer and the electrode is different from that in prior art such as Patent Literature 1.

Figure 4:
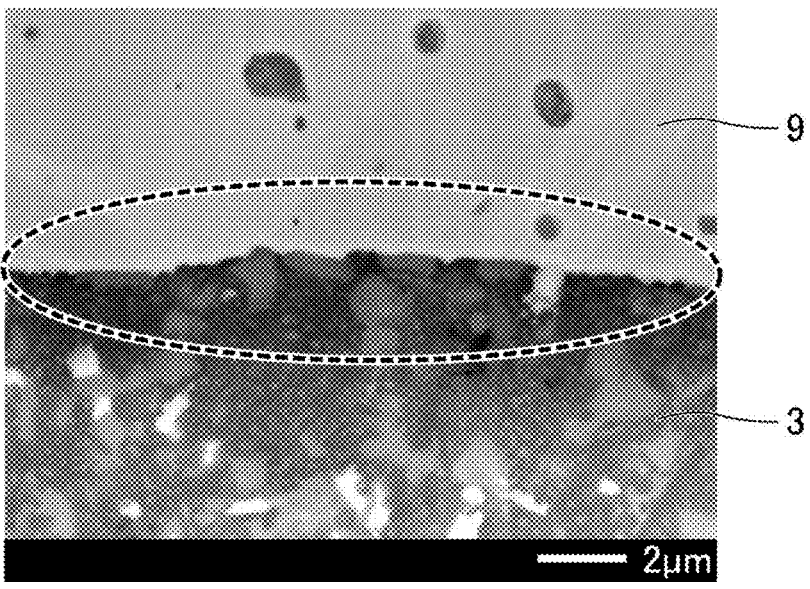
FIG. 4 is an electron microscope photo taken at and around an interface between a ceramic layer and an electrode in a conventional multilayer ceramic electronic component.
Figure 5:
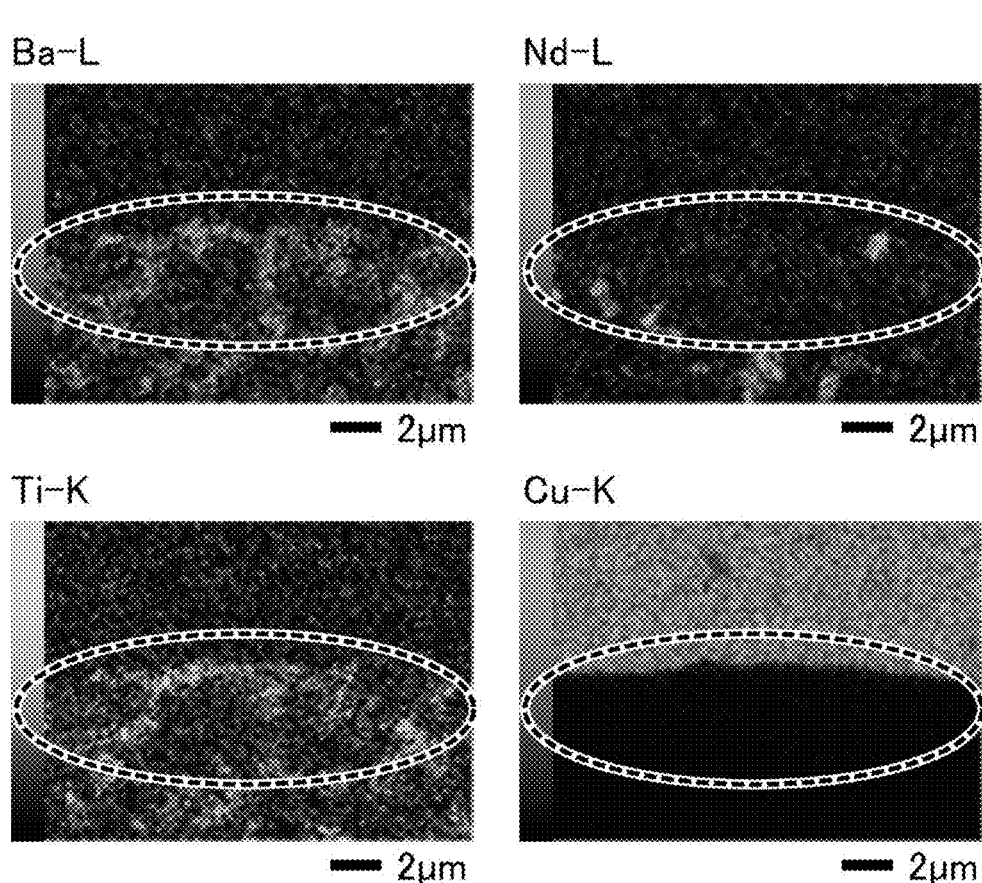
FIG. 5 is an elemental mapping image by EDX of the photo shown in FIG. 4.

Here, for comparison, an example is shown in which no Nd uneven distribution portion is present at an interface where the ceramic layer is in contact with the electrode. FIG. 4 is an electron microscope photo taken at and around an interface between a ceramic layer and an electrode in a conventional multilayer ceramic electronic component. FIG. 5 is an elemental mapping image by EDX of the photo shown in FIG. 4.

The Nd elemental mapping image shown in the upper right of FIG. 5 indicates that no Nd uneven distribution portion is present at the interface where the ceramic layer is in contact with the electrode. A multilayer ceramic electronic component in which no Nd uneven distribution portion is present has lower adhesion strength between the ceramic layer and the electrode than the multilayer ceramic electronic component of the present disclosure.

Preferred embodiments of the multilayer ceramic electronic component of the present disclosure are described again.

The Nd uneven distribution portion spreads along the interface where the ceramic layer is in contact with the electrode, and the Nd uneven distribution portion spreads with a certain thickness along the interface where the ceramic layer is in contact with the electrode.

The thickness of the Nd uneven distribution portion in the multilayer ceramic electronic component of the present disclosure is preferably 0.2 μm to 5 μm, more preferably 1 μm to 3 μm.

The thickness of the Nd uneven distribution portion can be determined by measuring the thickness of a portion where the Nd distribution is dense in the Nd elemental mapping image.

Preferably, the ceramic layer contains celsian $(BaAl_2Si_2O_8)$. Preferably, the thickness of the Nd uneven distribution portion is greater than the smallest celsian crystal size.

FIG. 2 shows celsian crystals as gray particles (the particles surrounded by solid lines in FIG. 2). Among the celsian crystal particles observed in the photo, the diameter of the smallest particle is regarded as "the smallest celsian crystal size". The celsian crystal diameter can be obtained as the diameter (equivalent circle diameter) of the circle whose area is equal to the area of the celsian crystal determined from the image.

When the thickness of the Nd uneven distribution portion is greater than the smallest celsian crystal size and the Nd uneven distribution portion is present such that the celsian crystals are included therein, the adhesion strength between the ceramic layer and the electrode can be further increased.

Preferably, the Nd, Ti, and Ba concentrations in the Nd uneven distribution portion are two or more times the Nd, Ti, and Ba concentrations in a portion other than the Nd uneven distribution portion of the ceramic layer, respectively.

Whether the above conditions are satisfied can be confirmed by determining the peak intensity by EDX point analysis and calculating the peak intensity ratio.

When the Ba—Ti—Nd oxide is unevenly distributed in the entire Nd uneven distribution portion, not only Nd but also Ti and Ba are unevenly distributed.

In the multilayer ceramic electronic component of the present disclosure, preferably, the Nd uneven distribution portion is present along the entire periphery of the interface where the ceramic layer is in contact with the electrode. This assumes a case where the electrode is an internal electrode or a via hole conductor and the internal electrode or the via hole conductor is entirely surrounded by the ceramic layers.

The Nd uneven distribution portion, when present along the entire periphery of the interface where the ceramic layer is in contact with the electrode, can improve the adhesion strength between the electrodes such as the internal electrodes and the via hole conductors and the ceramic layers.

The electrode material is not limited, but an electrode containing Cu is preferred. When the electrode contains Cu, the Nd uneven distribution portion tends to be suitably formed at the interface where the ceramic layer is in contact with the electrode.

The electrode may contain a ceramic material and a glass material common to the components of the ceramic layer.

The ceramic layer may contain an alkaline earth metal, such as Cao. The presence of an alkaline earth metal promotes diffusion of the Ba—Nd—Ti oxide when the ceramic layer is formed by firing, so that the Nd uneven distribution portion where Nd is unevenly distributed is easily formed at the interface where the ceramic layer is in contact with the electrode.

The ceramic layer may contain other components such as alumina, Ba—Al—Si oxide, $CaZrO_3$, and $CaTiO_3$. The ceramic layer may also contain other glass as a sintering aid, in addition to the barium borosilicate glass.

In the multilayer ceramic electronic component of the present disclosure, preferably, a Ba—Nd—Ti oxide spreads along in an inner portion of the ceramic layer.

The inner portion of the ceramic layer is a region that is distant to some degree from the interfaces in contact with the electrodes. An example of such a region is shown as a region B in FIG. 1.

Hereinafter, the structure of the inner portion of the ceramic layer is described.

Figure 6:
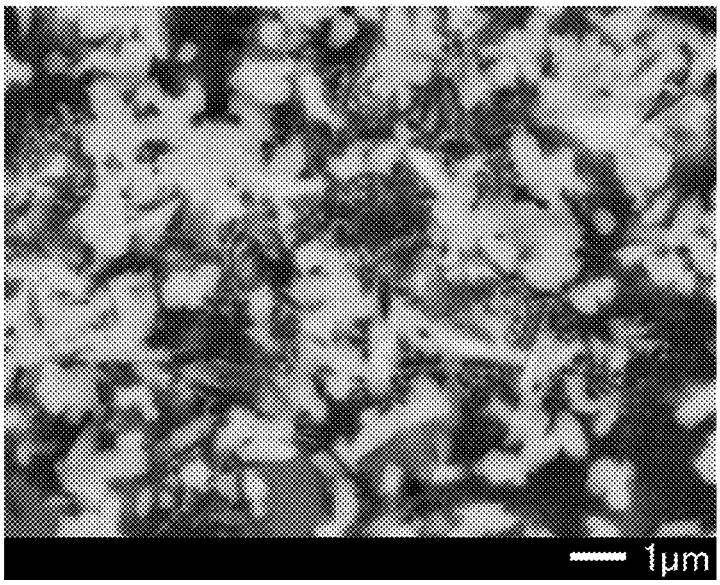
FIG. 6 is an electron microscope photo of an inner portion of a ceramic layer in which a Ba—Nd—Ti oxide spreads.
Figure 7:
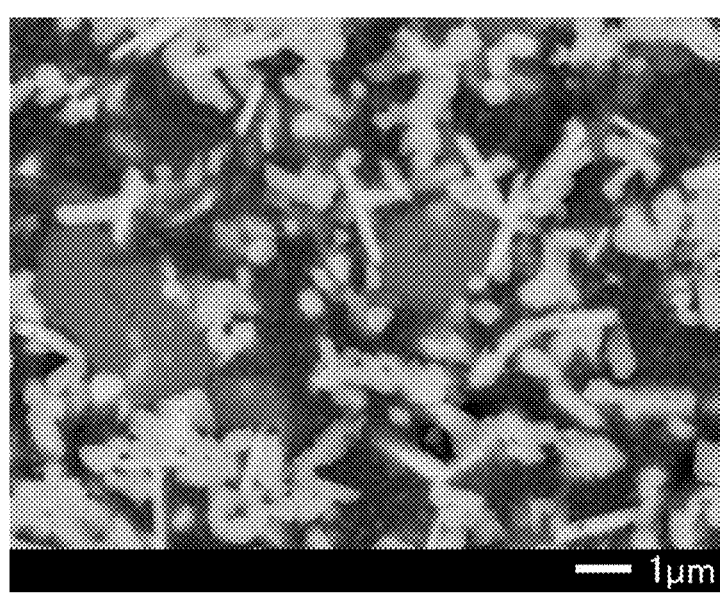
FIG. 7 is an electron microscope photo of an inner portion of a ceramic layer in which a Ba—Nd—Ti oxide does not spread.

FIG. 6 is an electron microscope photo of an inner portion of a ceramic layer in which a Ba—Nd—Ti oxide spreads. FIG. 7 is an electron microscope photo of an inner portion of a ceramic layer in which a Ba—Nd—Ti oxide does not spread.

The photo shown in FIG. 6 is taken of a multilayer ceramic electronic component having a Nd uneven distribution portion. In contrast, the photo shown in FIG. 7 is taken of a multilayer ceramic electronic component not having a Nd uneven distribution portion.

Each of the photos in FIG. 6 and FIG. 7 is a photo of a portion (a portion corresponding to the region B in FIG. 1) located inward in a thickness direction of the ceramic layer from the interface where the ceramic layer is in contact with the electrode.

In each of the photos shown in FIG. 6 and FIG. 7, the Ba—Nd—Ti oxide appears white, the forsterite and the glass appear black, and the celsian appears gray.

A comparison between FIG. 6 and FIG. 7 shows that the Ba—Nd—Ti oxide that appears white spreads in the form of white particles in FIG. 6, whereas the Ba—Nd—Ti oxide appears as white thin rod-shaped particles in FIG. 7. Based on this difference, it is determined that the Ba—Nd—Ti oxide spreads in the inner portion of the ceramic layer in FIG. 6.

In FIG. 6, mesh crystals that appear white seem to be diffused in the glass that appears black (the Ba—Nd—Ti oxide seems to be linearly spread across the glass).

When the Ba—Nd—Ti oxide spreads in the inner portion of the ceramic layer, cracking between the ceramic layer and the electrode is prevented.

The multilayer ceramic electronic component of the present disclosure includes multiple ceramic layers, and preferably no Nd uneven distribution portion is present at the interface between adjacent ceramic layers. The multiple ceramic layers include a first ceramic layer and a second ceramic layer having different compositions, and preferably no Nd uneven distribution portion is present at the interface between the first ceramic layer and the second ceramic layer adjacent to each other.

The following describes the above embodiment.

FIG. 1 shows that the ceramic layers 3 of the multilayer ceramic electronic component 2 include two types of ceramic layers, i.e., the first ceramic layers 4 and the second ceramic layer 5. An interface is present between the first ceramic layer 4 and the second ceramic layer 5. A region including such an interface is shown as a region C in FIG. 1.

There are multiple first ceramic layers 4, and an interface is present between adjacent first ceramic layers 4. A region including such an interface is shown as a region D in FIG. 1.

Preferably, no Nd uneven distribution portion is present between the first ceramic layer 4 and the second ceramic layer 5, and preferably no Nd uneven distribution portion is present between adjacent first ceramic layers 4.

In other words, preferably, no Nd uneven distribution portion is present between the ceramic layers having different compositions. In addition, preferably, no Nd uneven distribution portion is present between the ceramic layers having the same composition.

Changes in physical properties of the ceramic layers due to the presence of the Nd uneven distribution portion can be suppressed by providing no Nd uneven distribution portion between the ceramic layers, whereby a decrease in the strength of the ceramic layers can be prevented.

That no Nd uneven distribution portion is present between the ceramic layers indicates that the components are not diffused between the ceramic layers and that each ceramic layer has a stable composition.

Figure 8:
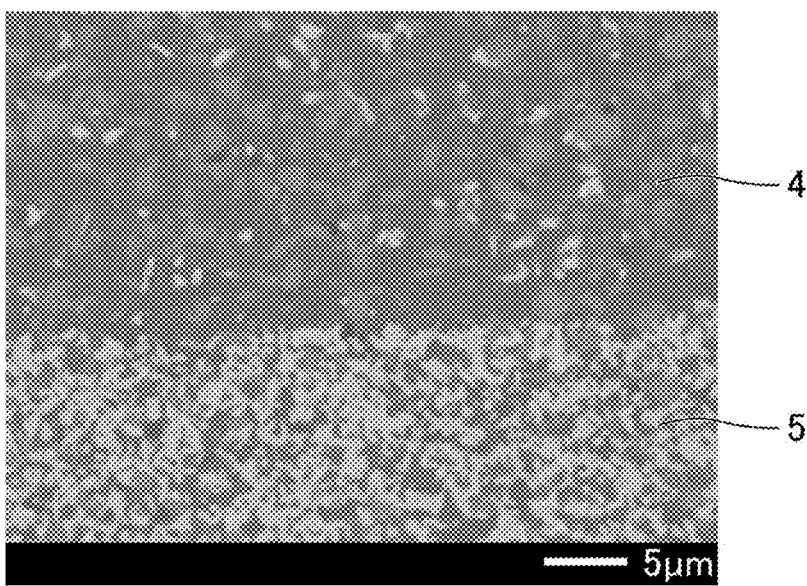
FIG. 8 is an electron microscope photo of an interface between ceramic layers having different compositions.

FIG. 8 is an electron microscope photo of an interface between the ceramic layers having different compositions.

In FIG. 8, the second ceramic layer 5 as a high permittivity ceramic layer containing a Ba—Nd—Ti oxide as a main component is shown on the lower side, and the first ceramic layer 4 as a low permittivity ceramic layer containing forsterite as a main component is shown on the upper side. Since the Ba—Nd—Ti oxide appears white on the electron microscope photo, the second ceramic layer 5 appears whiter than the first ceramic layer 4.

No Nd uneven distribution portion is present at a boundary between the second ceramic layer 5 and the first ceramic layer 4 having different compositions. If the Nd uneven distribution portion was present in the second ceramic layer 5, there would be a layer that appears quite white at the boundary, but no such a layer is present. In addition, if the Nd uneven distribution portion was present in the first ceramic layer 4, there would be a layer that appears whiter than other portions at the boundary, but no such a layer is present.

When the ceramic layers include a first ceramic layer and a second ceramic layer having different compositions, the types of the components in each ceramic layer may be the same, and each ceramic layer may have a different composition due to the difference in proportions of the components in each ceramic layer.

For example, the first ceramic layer may be one containing forsterite as a main component, a Ba—Nd—Ti oxide as a subcomponent, and barium borosilicate glass and MnO as sintering aids.

The second ceramic layer may be one containing a Ba—Nd—Ti oxide as a main component, forsterite as a subcomponent, and barium borosilicate glass and MnO as sintering aids.

When such a first ceramic layer is combined with such a second ceramic layer, the first ceramic layer is a low permittivity ceramic layer having a relatively low permittivity and the second ceramic layer is a high permittivity ceramic layer having a relatively high permittivity.

The second ceramic layer 5 as a high permittivity ceramic layer is suitable as a ceramic layer to be arranged to provide capacitance between the electrodes so as to form a capacitor.

The first ceramic layer 4 as a low permittivity ceramic layer is suitable for increasing high frequency characteristics of the multilayer ceramic electronic component.

Hereinafter, an example of a method for producing the multilayer ceramic electronic component of the present disclosure is described.

Figures 9, 10, 11, 12, 13:
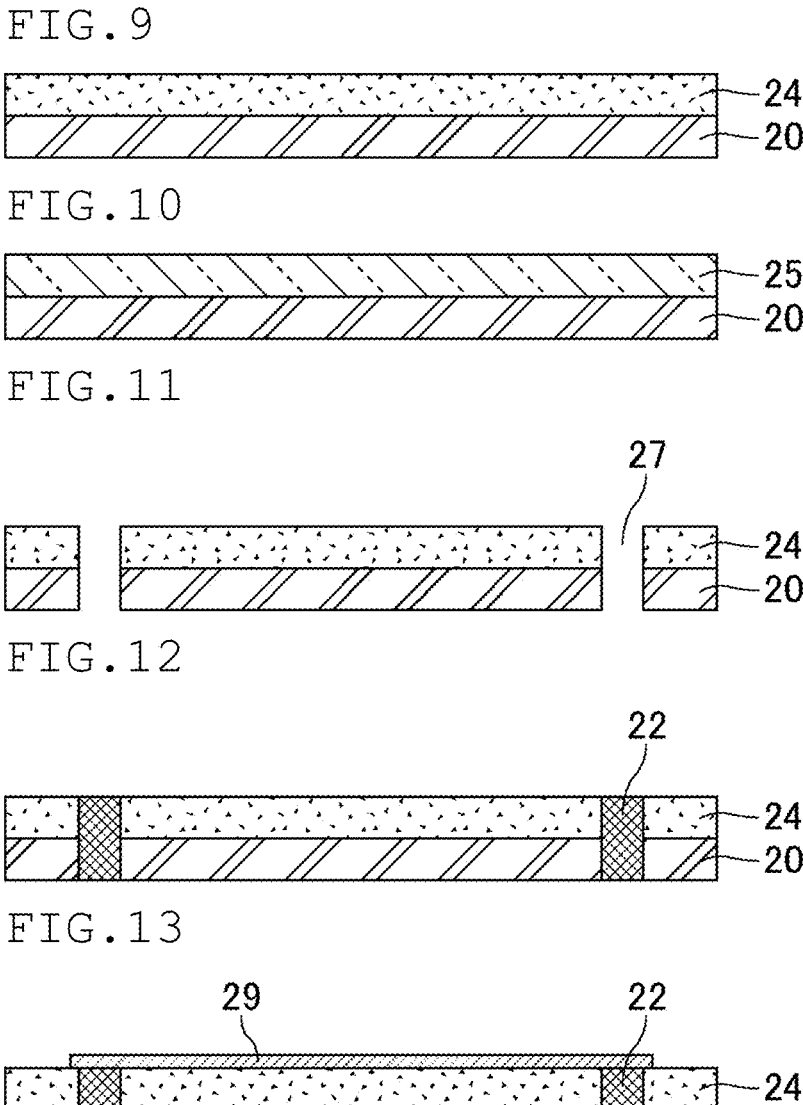
FIG. 9 is a schematic process view of an example of a ceramic green sheet forming step.
FIG. 10 is a schematic process view of an example of the ceramic green sheet forming step.
FIG. 11 a schematic process view of an example of an electrode pattern forming step.
FIG. 12 is a schematic process view of an example of the electrode pattern forming step.
FIG. 13 is a schematic process view of an example of the electrode pattern forming step.

FIG. 9 and FIG. 10 are each a schematic process view of an example of a ceramic green sheet forming step.

FIG. 9 shows that a first ceramic green sheet 24 for forming the first ceramic layer is formed on a carrier film 20 (e.g., a polyethylene terephthalate (PET) film). FIG. 10 shows that a second ceramic green sheet 25 for forming the second ceramic layer is formed on the carrier film 20.

Specifically, an organic vehicle containing a binder resin and a solvent is added to a raw material composition containing a Ba—Nd—Ti oxide, forsterite, barium borosilicate glass, and MnO, whereby a ceramic slurry is obtained. The ceramic slurry is formed into a sheet by doctor-blading and dried, whereby a ceramic green sheet is obtained.

The proportions of the components in the ceramic slurry are adjusted, whereby the first ceramic green sheet 24 and the second ceramic green sheet 25 having different compositions are produced.

FIG. 11, FIG. 12, and FIG. 13 are each a schematic process view of an example of the electrode pattern forming step.

As shown in FIG. 11, holes are drilled in the first ceramic green sheet 24 to form through holes 27. The through holes 27 can be formed by laser drilling or punching.

Next, as shown in FIG. 12, the through holes 27 are filled with a conductive paste 22.

Further, as shown in FIG. 13, a conductive paste 29 is applied to a surface of the first ceramic green sheet 24.

The conductive paste 22 filling the through hole is a conductive paste that turns into a via hole conductor. The conductive paste 29 printed on the surface of the ceramic green sheet is a conductive paste that turns into an internal electrode or an external electrode.

Filling with the conductive paste and application of the conductive paste can be performed by a method such as screen printing or photolithography.

FIG. 11, FIG. 12, and FIG. 13 each show an example in which an electrode pattern is formed on the first ceramic green sheet 24. An electrode pattern can also be similarly formed on the second ceramic green sheet 25.

Preferably, the conductive paste contains Cu. The conductive paste may contain an alkaline earth metal, such as Cao. The presence of an alkaline earth metal promotes diffusion of the Ba—Nd—Ti oxide when the ceramic layer is formed by firing, so that the Nd uneven distribution portion where Nd is unevenly distributed is easily formed at the interface where the ceramic layer is in contact with the electrode.

Figure 14:
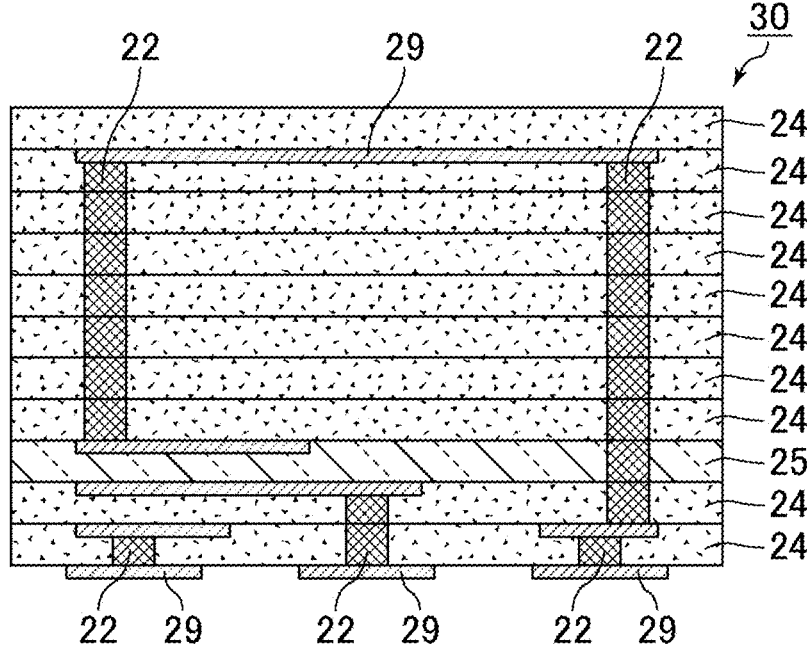
FIG. 14 is a schematic process view of an example of a stacking step.
Figure 15:
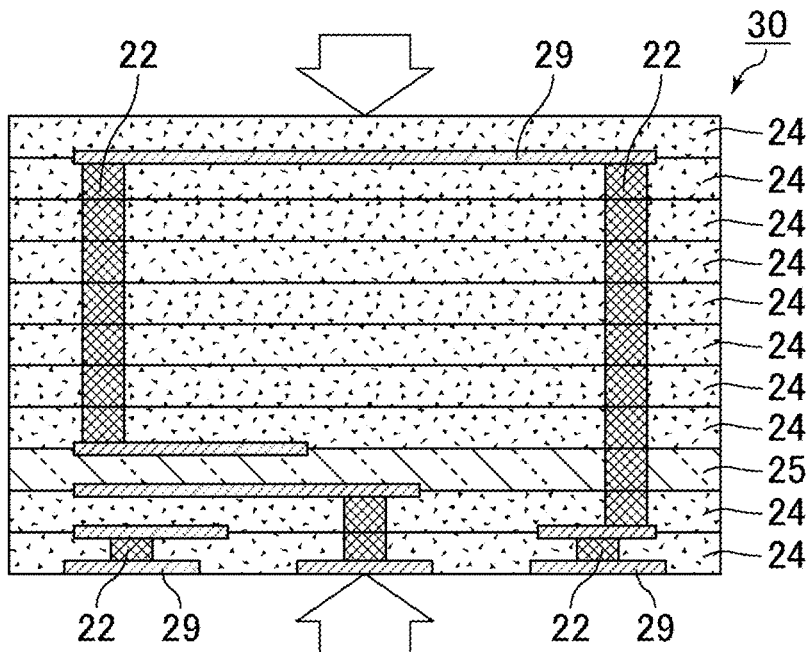
FIG. 15 is a schematic process view of an example of a pressing step.

FIG. 14 is a schematic process view of an example of a stacking step. FIG. 15 is a schematic process view of an example of a pressing step.

As shown in FIG. 14, in the stacking step, the first ceramic green sheets 24 and the second ceramic green sheet 25 are stacked to form a stack 30.

A ceramic green sheet having a composition that turns into a high permittivity ceramic layer (the second ceramic green sheet 25) may be used as the ceramic green sheet to be located at a position where a capacitor is formed.

As shown in FIG. 15, the stack 30 is pressed in the pressing step. Pressing causes the conductive paste 29 to be embedded in the first ceramic green sheets 24 and the second ceramic green sheet 25.

Figure 16:
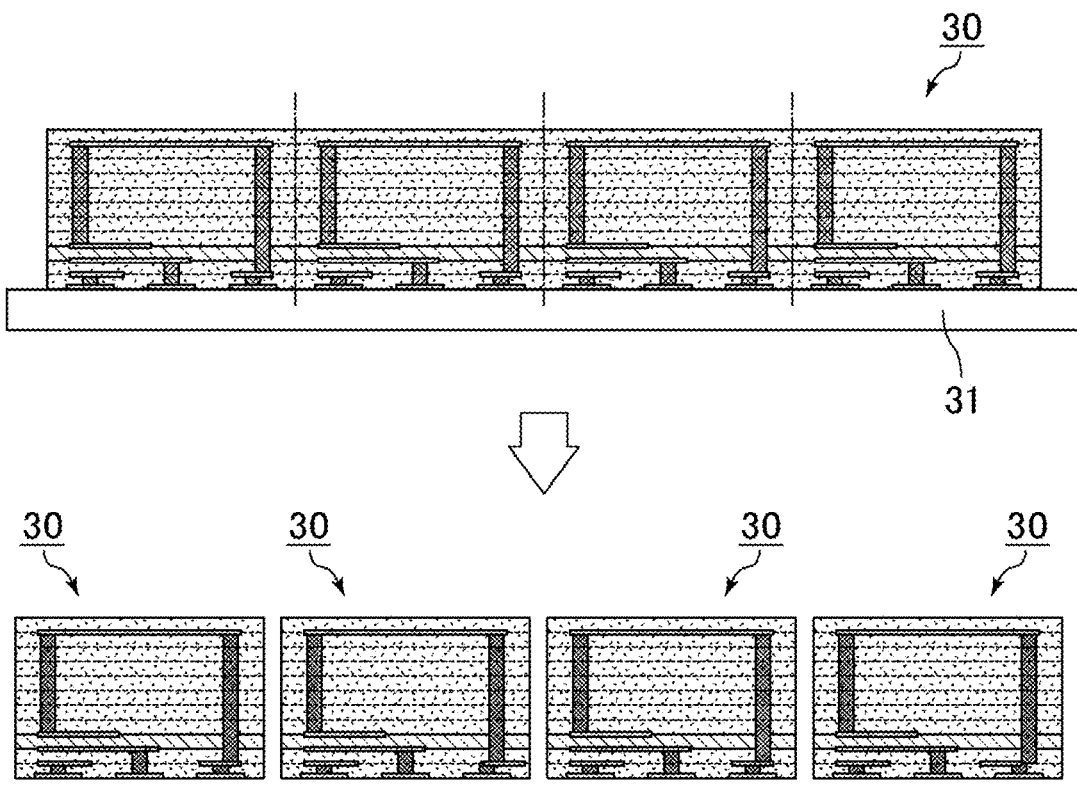
FIG. 16 is a schematic process view of an example of a cutting step.

FIG. 16 is a schematic process view of an example of a cutting step. FIG. 15 shows the stack as an independent object. Yet, in the actual production process, preferably, many stacks are formed in the form of a single sheet on a tape 31 and cut into individual pieces so as to obtain many stacks. FIG. 16 shows a step of cutting the stack formed in the form of a single sheet into individual pieces.

Figure 17:
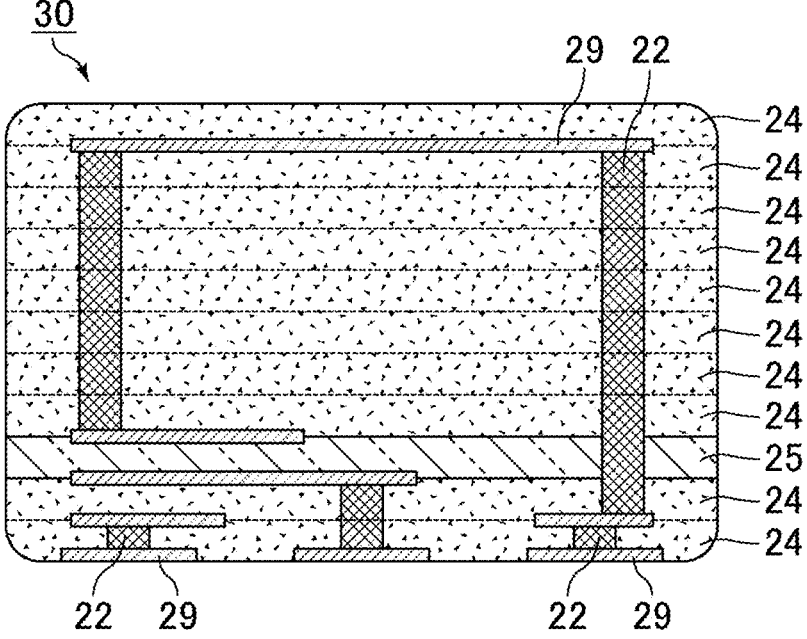
FIG. 17 is a schematic process view of an example of a barrel polishing step.

FIG. 17 is a schematic process view of an example of a barrel polishing step.

In the barrel polishing, the corners of the stack 30 are polished. FIG. 17 shows that the corners of the stack 30 are rounded.

Figure 18:
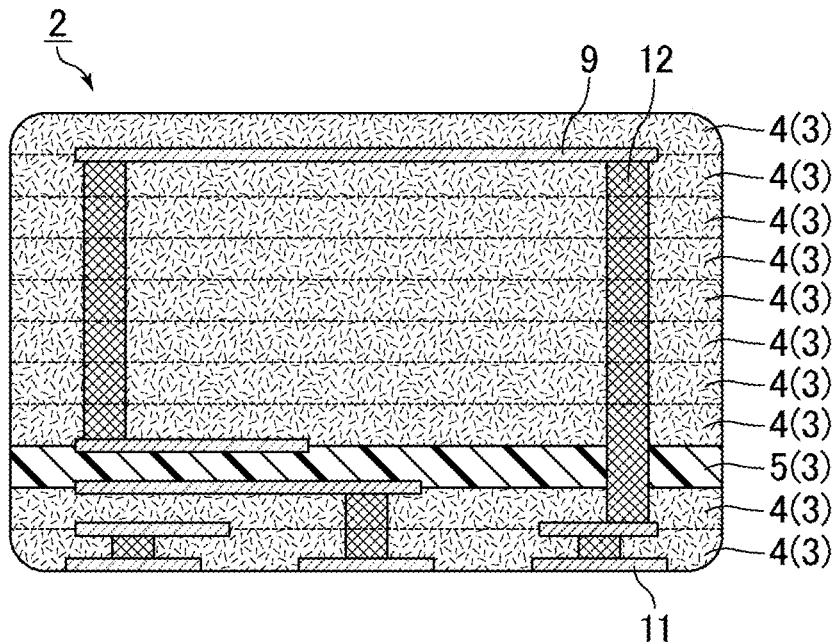
FIG. 18 is a schematic process view of an example of a firing step.

FIG. 18 is a schematic process view of an example of a firing step.

In the firing step, the first ceramic green sheets 24 are fired into the first ceramic layers 4, and the second ceramic green sheet 25 is fired into the second ceramic layer 5. The conductive paste 22 is fired into the via hole conductor 12, and the conductive paste 29 is fired into the internal electrodes 9 and the external electrodes 11.

This process provides the multilayer ceramic electronic component 2.

In the firing step, firing is performed at a temperature at which the ceramic material of the ceramic green sheets can be sintered. For example, the firing is performed at the maximum temperature of 800° C. to 1000° C.

When the main component of the conductive paste is Cu, a preferred firing atmosphere is a reducing atmosphere or a low oxygen atmosphere such as a nitrogen atmosphere. When the main component of the conductive paste is Ag, firing can be performed in air (oxidizing atmosphere).

The firing atmosphere may be gradually changed. The first half of the temperature-rise process may be performed in an oxidizing atmosphere, and the second half of the temperature-rise process and the stage at which the maximum temperature is maintained may be performed in a low oxygen atmosphere or a reducing atmosphere.

In the firing step, a method for adjusting the temperature profile in the temperature-drop process may be employed so that the Nd uneven distribution portion is present at the interface where the ceramic layer is in contact with the electrode.

Examples of the method include a method in which the temperature-drop time is prolonged as compared to a conventional method such as one disclosed in Patent Literature 1. For example, regarding the temperature drop from the maximum temperature 1000° C., a profile may be employed in which the temperature is dropped from 1000° C. to 700° C. over 800 minutes and then dropped from 700° C. to room temperature over 60 minutes, while conventionally, the temperature is dropped from 1000° C. to room temperature over 100 minutes.

When such a firing step is employed, a feature can be obtained in which the Ba—Nd—Ti oxide spreads within the inner portion of the ceramic layer. A feature in which no Nd uneven distribution portion is present at the interface between adjacent ceramic layers can also be obtained.

Figure 19:
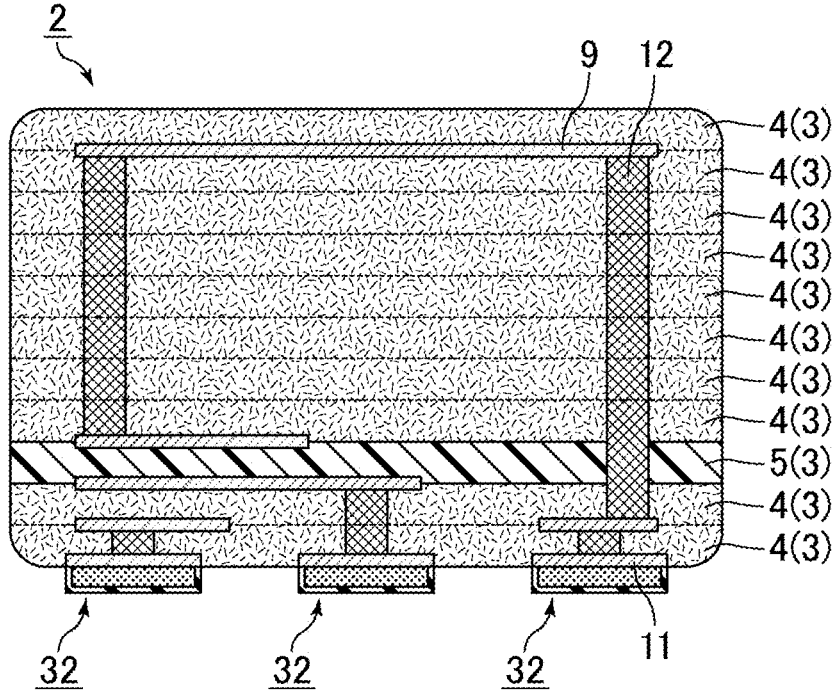
FIG. 19 is a schematic process view of an example of a plating step.

FIG. 19 is a schematic process view of an example of a plating step.

The plating layers 32 that turn into terminal electrodes are formed on the external electrodes 11 of the multilayer ceramic electronic component 2, if necessary. Plating layers plated with Cu, Ni, Sn, or the like can be used.

The multilayer ceramic electronic component may be used by being mounted on a mounting board (e.g., motherboard) via the external electrodes. The multilayer ceramic electronic component may also be used with chip components mounted on the external electrodes.

The present description discloses the followings.

Disclosed item (1) relates to a multilayer ceramic electronic component including: a ceramic layer containing a Ba—Nd—Ti oxide, forsterite, barium borosilicate glass, and MnO; and an electrode in contact with the ceramic layer, wherein the ceramic layer includes a Nd uneven distribution portion where Nd is unevenly distributed at an interface where the ceramic layer is in contact with the electrode.

Disclosed item (2) relates to the multilayer ceramic electronic component according to the disclosed item (1), wherein the Ba—Nd—Ti oxide spreads within the ceramic layer.

Disclosed item (3) relates to the multilayer ceramic electronic component according to the disclosed item 1 or 2, wherein the Nd uneven distribution portion is present along an entire periphery of the interface where the ceramic layer is in contact with the electrode.

Disclosed item (4) relates to the multilayer ceramic electronic component of any combination of the disclosed items (1) to (3), wherein the ceramic layer contains celsian, and a thickness of the Nd uneven distribution portion is greater than a smallest celsian crystal size.

Disclosed item (5) relates to the multilayer ceramic electronic component of any combination of the disclosed items 1 to 4, wherein Nd, Ti, and Ba concentrations in the Nd uneven distribution portion are two or more times Nd, Ti, and Ba concentrations in a portion other than the Nd uneven distribution portion of the ceramic layer, respectively.

Disclosed item (6) relates to the multilayer ceramic electronic component of any combination of the disclosed items (1) to (5), wherein the ceramic layer includes multiple ceramic layers, and no Nd uneven distribution portion is present at an interface between adjacent ceramic layers.

Disclosed item (7) relates to the multilayer ceramic electronic component according to the disclosed item 6, wherein the multiple ceramic layers include a first ceramic layer and a second ceramic layer having different compositions, and no Nd uneven distribution portion is present at an interface between the first ceramic layer and the second ceramic layer adjacent to each other.

Disclosed item (8) relates to the multilayer ceramic electronic component of any combination of the disclosed items (1) to (7), wherein the ceramic layer contains Cao.

Disclosed item (9) relates to the multilayer ceramic electronic component of any combination of the disclosed items (1) to (8), wherein the electrode contains Cu.

EXAMPLES

The following describes Example in which the adhesion strength between the ceramic layer and the electrode of the multilayer ceramic electronic component of the present disclosure was evaluated. The present disclosure is not limited to this Example.

Based on the method for producing the multilayer ceramic electronic component which was described with reference to FIG. 9 to FIG. 19 of the present description, a ceramic green sheet having a composition described below was subjected to filling with the conductive paste, application of the conductive paste, stacking, pressing, cutting, barrel polishing, and firing.

In the firing step, in Example, the temperature drop from the maximum temperature 1000° was performed according to a profile in which the temperature was dropped from 1000° C. to 700° C. over 800 minutes and then dropped from 700° C. to room temperature over 60 minutes. In Comparative Example, a profile was used in which the temperature was dropped from 1000° C. to room temperature over 100 minutes. Other conditions are the same between the Example and Comparative Example.

The compositions of the ceramic green sheet and the conductive paste are as follows.

First Ceramic Green Sheet That Turns Into Low Permittivity Ceramic Layer

Forsterite: 61 wt %

Ba—Nd—Ti oxide: 10 wt %

Barium borosilicate glass: 13 wt %

MnO: 15 wt %

CaO: 1 wt %

Other components: an appropriate amount of an organic vehicle containing a binder resin and a solvent Second Ceramic Green Sheet That Turns Into High Permittivity Ceramic Layer Ba—Nd—Ti oxide: 50 wt %

Forsterite: 28 wt %

Barium borosilicate glass: 13 wt %

MnO: 8 wt %

CaO: 1 wt %

Other components: an appropriate amount of an organic vehicle containing a binder resin and a solvent.

Conductive Paste

Cu: 99 wt %

CaO: 1 wt %

Other components: an appropriate amount of an organic vehicle containing a binder resin and a solvent In order to observe a boundary between the ceramic layer and the electrode, each sample produced was embedded in an epoxy resin, the resin was polished to expose a cross section including the boundary between the ceramic layer and the electrode, and the cross section was observed under a microscope. Twenty samples were observed.

As a result, the number of cracking events in the samples produced in Example was 0, while the number of cracking events in the samples produced in Comparative Example was 4.

In the samples produced in Example, the Nd uneven distribution portion was present in the ceramic layer at the interface where the ceramic layer was in contact with the electrode. In contrast, in the samples produced in Comparative Example, no Nd uneven distribution portion was present in the ceramic layer at the interface where the ceramic layer was in contact with the electrode.

This shows that the adhesion strength between the ceramic layer and the electrode was increased in the samples produced in Example.

REFERENCE SIGNS LIST 2 multilayer ceramic electronic component 3 ceramic layer 4 first ceramic layer 5 second ceramic layer 9 internal electrode 11 external electrode 12 via hole conductor 20 carrier film 22 conductive paste (conductive paste that turns into via hole conductors)

24 first ceramic green sheet 25 second ceramic green sheet 27 through hole 29 conductive paste (conductive paste that turns into internal electrodes or external electrodes)

30 stack 31 tape 32 plating layer

The invention claimed is:

1. A multilayer ceramic electronic component comprising:

a ceramic layer containing a Ba—Nd—Ti oxide, forsterite, barium borosilicate glass, and MnO; and an electrode in contact with the ceramic layer, wherein the ceramic layer includes a Nd uneven distribution portion where Nd is unevenly distributed at an interface where the ceramic layer is in contact with the electrode.

2. The multilayer ceramic electronic component according to claim 1, wherein the Ba—Nd—Ti oxide spreads within the ceramic layer.

3. The multilayer ceramic electronic component according to claim 1, wherein the Nd uneven distribution portion has a thickness of 0.2 μm to 5 μm along the interface with the ceramic layer.

4. The multilayer ceramic electronic component according to claim 3, wherein the thickness of the Nd uneven distribution portion along the interface with the ceramic layer is 1 μm to 3 μm.

5. The multilayer ceramic electronic component according to claim 1, wherein the Nd uneven distribution portion is present along an entire periphery of the interface where the ceramic layer is in contact with the electrode.

6. The multilayer ceramic electronic component according to claim 1, wherein the ceramic layer contains celsian, and a thickness of the Nd uneven distribution portion is greater than a smallest celsian crystal size.

7. The multilayer ceramic electronic component according to claim 1, wherein Nd, Ti, and Ba concentrations in the Nd uneven distribution portion are two or more times Nd, Ti, and Ba concentrations in a portion other than the Nd uneven distribution portion of the ceramic layer, respectively.

8. The multilayer ceramic electronic component according to claim 1, wherein the Ba—Ti—Nd oxide is unevenly distributed in the entire Nd uneven distribution portion.

9. The multilayer ceramic electronic component according to claim 1, wherein the ceramic layer contains an alkaline earth metal.

10. The multilayer ceramic electronic component according to claim 1, wherein the Ba—Nd—Ti oxide is located in an inner portion of the ceramic layer.

11. The multilayer ceramic electronic component according to claim 1, wherein the ceramic layer includes multiple ceramic layers, and no Nd uneven distribution portion is present at an interface between adjacent ceramic layers.

12. The multilayer ceramic electronic component according to claim 11, wherein the multiple ceramic layers include a first ceramic layer and a second ceramic layer having different compositions, and no Nd uneven distribution portion is present at an interface between the first ceramic layer and the second ceramic layer adjacent to each other.

13. The multilayer ceramic electronic component according to claim 12, wherein the first ceramic layer has a permittivity lower than a permittivity of the second ceramic layer.

14. The multilayer ceramic electronic component according to claim 1, wherein the ceramic layer contains CaO.

15. The multilayer ceramic electronic component according to claim 1, wherein the electrode contains Cu.

\* \* \* \* \*